(12) United States Patent
Takasugi et al.

(10) Patent No.: US 12,310,383 B2
(45) Date of Patent: May 27, 2025

(54) FERMENTED MILK FOR PROMOTING ELEVATION OF AMINO ACID CONCENTRATION IN BLOOD

(71) Applicant: MEIJI CO., LTD., Tokyo (JP)

(72) Inventors: Satoshi Takasugi, Tokyo (JP); Yoshitaka Kawai, Tokyo (JP); Masashi Nagata, Tokyo (JP); Taketo Yamaji, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 1098 days.

(21) Appl. No.: 16/499,516

(22) PCT Filed: Apr. 4, 2018

(86) PCT No.: PCT/JP2018/014351
§ 371 (c)(1),
(2) Date: Sep. 30, 2019

(87) PCT Pub. No.: WO2018/186425
PCT Pub. Date: Oct. 11, 2018

(65) Prior Publication Data
US 2020/0037626 A1   Feb. 6, 2020

(30) Foreign Application Priority Data

Apr. 6, 2017   (JP) ................................ 2017-076225

(51) Int. Cl.
*A23C 9/127* (2006.01)
*A23L 33/19* (2016.01)

(52) U.S. Cl.
CPC .............. *A23C 9/127* (2013.01); *A23L 33/19* (2016.08)

(58) Field of Classification Search
CPC ........... A23C 9/123; A23C 9/12; A23C 9/127; A23L 33/19; A23L 33/18
See application file for complete search history.

(56) References Cited

U.S. PATENT DOCUMENTS

| | | | |
|---|---|---|---|
| 2008/0279966 A1 | 11/2008 | Clement et al. | |
| 2011/0287147 A1* | 11/2011 | Pannell | A23G 9/04 426/89 |
| 2015/0342208 A1* | 12/2015 | Bunce | A23C 9/1307 426/583 |

FOREIGN PATENT DOCUMENTS

| | | |
|---|---|---|
| CN | 105658231 | 6/2016 |
| JP | 2013-094076 | 5/2013 |

OTHER PUBLICATIONS

Office Action issued Jun. 7, 2022 in Japanese Patent Application No. 2019-511271, with English-language translation.
Notice of Reasons for Refusal issued Mar. 4, 2022 in corresponding Japanese Patent Application No. 2019-511271, with English Machine Translation.
Notification of Transmittal of Translation of the International Preliminary Report on Patentability issued Oct. 17, 2019 in corresponding International (PCT) Application No. PCT/JP2018/014351, with English translation.
Office Action issued Aug. 1, 2022 in corresponding Chinese Patent Application No. 201880022895.5, with English language translation.
Taiwanese Office Action dated Sep. 13, 2021 in Taiwanese Patent Application No. 107111619, with English translation.
International Search Report and Written Opinion of the International Searching Authority issued Jul. 3, 2018 in International (PCT) Application No. PCT/JP2018/014351, with English translation of the International Search Report.
Dougkas et al., "Differential effects of dairy snacks on appetite, but not overall energy intake", British Journal of Nutrition, vol. 108, pp. 2274-2285, 2012.
Iwabuchi et al., "Nitrogen Distribution in the Stomach and Free Amino Acid Concentration in the Portal Blood Plasma of Rat Fed Fermented Milk Powder", Japan Society of Nutrition and Food Science, vol. 39, pp. 449-455, 1986, with abstract.
Walrand et al., "Consumption of a Functional Fermented Milk Containing Collagen Hydrolysate Improves the Concentration of a Collagen-Specific Amino Acids in Plasma", Journal of Agricultural and Food Chemistry, vol. 56, pp. 7790-7795, 2008.
Toba et al., "Review on blood amino acid concentration in human after single ingestion of fermented milk", The 53rd Lecture Abstract in Meeting of Japan Society of Nutrition and Food Science, 2G-15A, 1999.
Internet:<URL:http://www.mext.go.jp/a_menu/syokuhinseibun/1365295.htm>, Chap 2: 13 Dairy products, fermented milk and lactic beverage, non-official translation, Japan food standard ingredient table 2015, 7th revised edition, Dec. 25, 2015, retrieval date Jun. 18, 2018.
Office Action issued Oct. 27, 2023 in corresponding Japanese Patent Application No. 2002-171760, with English machine translation, 11 pages.
Office Action issued Mar. 1, 2024 in corresponding Japanese Patent Application No. 2022-171760, with English machine translation, 5 pages.

* cited by examiner

*Primary Examiner* — Jeffrey P Mornhinweg
(74) *Attorney, Agent, or Firm* — Wenderoth, Lind & Ponack, L.L.P.

(57) ABSTRACT

Provided is fermented milk for promoting elevation of amino acid concentration in the blood, by which elevation of amino acid concentration in the blood of a subject can be promoted. By making a subject ingest the fermented milk comprising a milk protein concentration of 1.9% by mass or more, elevation of amino acid concentration in the blood of the subject can be promoted.

9 Claims, No Drawings

FERMENTED MILK FOR PROMOTING ELEVATION OF AMINO ACID CONCENTRATION IN BLOOD

CROSS-REFERENCE TO RELATED APPLICATIONS

This application is based upon and claims the benefit of priority from Japanese Patent Application No. 2017-76225, filed Apr. 6, 2017; the entire contents of which are incorporated herein by reference.

FIELD OF THE INVENTION

The present invention relates to fermented milk for promoting elevation of amino acid concentration in the blood, wherein the concentration of the milk protein in the fermented milk is 1.9% by mass or more.

BACKGROUND ART

In recent years, muscle loss associated with sarcopenia has attracted attention. Muscle atrophy increases the risk of need for nursing care and assistance and is said to be a significant cause of reduction of the quality of life and lower healthy life expectancy of aged people. Therefore, the prevention of muscle loss associated with sarcopenia is a major challenge of Japan confronting the super-ageing society.

In order to prevent muscle loss associated with sarcopenia, it is essential for patients to ingest proteins and branched-chain amino acids (BCAA) or protein sources that have a fast absorption rate and easily raise amino acid concentration in the blood. For example, it is known that leucine (Leu), which is one of BCAA, plays an essential role in promoting synthesis of muscle proteins (refer to Non Patent Documents 1 to 3). Especially in aged people, it has been suggested that elevating the peak concentration of Leu in the blood is useful for muscle synthesis (refer to Non Patent Documents 4 to 6). However, ingestion of a large amount of protein and BCAA has been a problem from the viewpoint of manufacturing feasibility and ease of ingestion of such products.

Therefore, there is a need for the development of a product that has excellent manufacturing feasibility and ease of ingestion.

So far, a method of producing a peptide mixture is disclosed in which fat-free milk solid content in raw materials is 9 to 15 wt %, and the content ratio of saccharide assimilable by lactic acid bacteria with respect to the protein is 1.53 to 3.9 times by a weight ratio in the raw materials (refer to Patent Document 1). However, nothing is disclosed in terms of any specific fermented milk promoting elevation of amino acid concentration in the blood.

PRIOR ART REFERENCES

Patent Documents

[Patent Document 1] WO2006/004105

Non Patent Documents

[Non Patent Document 1] Anthony J C et al., 1999, Leucine supplementation enhances skeletal muscle recovery in rats following exercise, J Nutr. 1999, 129: 1102-1106.
[Non Patent Document 2] Koopman R et al., 2005, Combined ingestion of protein and free leucine with carbohydrate increases postexercise muscle protein synthesis in vivo in male subjects, Am J Physiol Endocrinol Metab., 288: E645-E653.
[Non Patent Document 3] Atherton P J et al., 2010, Distinct anabolic signalling responses to amino acids in C2C12 skeletal muscle cells, Amino Acids., 38:1533-1539.
[Non Patent Document 4] Breen L & Phillips S M., 2011, Skeletal muscle protein metabolism in the elderly: Interventions to counteract the 'anabolic resistance' of ageing, Nutr Metab (Lond). 8:68. doi: 10.1186/1743-7075-8-68.
[Non Patent Document 5] Katsanos C S et al., 2006, A high proportion of leucine is required for optimal stimulation of the rate of muscle protein synthesis by essential amino acids in the elderly, Am J Physiol Endocrinol Metab., 291: E381-E387.
[Non Patent Document 6] Rieu I et al., 2006, Leucine supplementation improves muscle protein synthesis in elderly men independently of hyperaminoacidaemia. J Physiol., 575 (Pt 1):305-315.

SUMMARY OF THE INVENTION

The present inventors have found that by making a subject ingest specific fermented milk, elevation of amino acid concentration in the blood of the subject can be significantly promoted.

Therefore, the present invention is intended to provide fermented milk for promoting elevation of amino acid concentration in the blood, a method for promoting elevation of amino acid concentration in the blood and the like.

According to the present invention, the following inventions are provided.

(1) Fermented milk for promoting elevation of amino acid concentration in the blood, wherein the concentration of the milk protein in the fermented milk is 1.9% by mass or more.
(2) The fermented milk for promoting elevation of amino acid concentration in the blood according to (1), wherein the concentration of the milk protein in the fermented milk is 3.0% by mass or more.
(3) The fermented milk for promoting elevation of amino acid concentration in the blood according to (1) or (2), wherein the fermented milk is fermented by *Lactobacillus delbrueckii* subsp. *bulgaricus* and *Streptococcus thermophilus*.
(4) The fermented milk for promoting elevation of amino acid concentration in the blood according to any one of (1) to (3), wherein the fermented milk is for promoting elevation of essential amino acid concentration in the blood.
(5) The fermented milk for promoting elevation of amino acid concentration in the blood according to any one of (1) to (3), wherein the fermented milk is for promoting elevation of branched-chain amino acid concentration in the blood.
(6) A food for promoting elevation of amino acid concentration in the blood, comprising the fermented milk according to any one of (1) to (5).
(7) A method for promoting elevation of amino acid concentration in the blood comprising making a subject ingest fermented milk comprising a milk protein concentration of 1.9% by mass or more.
(8) Use of fermented milk for promoting elevation of amino acid concentration in the blood, wherein the concentration of a milk protein in the fermented milk is 1.9% by mass or more.

(9) A food composition for promoting elevation of amino acid concentration in the blood containing fermented milk, wherein the concentration of a milk protein in the fermented milk is 1.9% by mass or more.

(10) Use of fermented milk, wherein the concentration of a milk protein in the fermented milk is 1.9% by mass or more, for producing a food composition for promoting elevation of amino acid concentration in the blood.

(11) Fermented milk, wherein the concentration of a milk protein in the fermented milk is 1.9% by mass or more, for promoting elevation of amino acid concentration in the blood.

The fermented milk of the present invention is advantageous in that making a subject ingest the fermented milk of the present invention can significantly promote elevation of amino acid concentration in the blood of the subject. The fermented milk of the present invention is also advantageous in consideration of excellent manufacturing feasibility and ease of ingestion.

DETAILED DESCRIPTION OF THE INVENTION

Deposit of Microorganisms

*Lactobacillus delbrueckii* subsp. *bulgaricus* OLL205013 strain is deposited internationally under the Budapest Treaty as accession No. NITE BP-02411 dated Feb. 3, 2017 (original deposit date) by the National Institute of Technology and Evaluation, Patent Microorganisms Depositary (2-5-8, Kazusakamatari, Kisarazu-city Chiba, Japan, Room No. 122).

*Streptococcus thermophilus* OLS3290 strain is deposited internationally under the Budapest Treaty as accession No. FERM BP-19638 dated Jan. 19, 2004 (original deposition date) by the National Institute of Technology and Evaluation, International Patent Organisms Depositary (2-5-8, Kazusakamatari, Kisarazu-city Chiba, Japan, Room No. 120). Incidentally, the present deposit strain was transferred from the domestic deposition (original deposit) to the international deposition under the Budapest Treaty dated Sep. 30, 2013, (Date of issue) (Transfer request was accepted on Sep. 6, 2013).

The fermented milk of the present invention is fermented milk for promoting elevation of amino acid concentration in the blood, wherein the concentration of a milk protein in the fermented milk is 1.9% by mass or more.

The fermented milk of the present invention can be obtained as a culture that is fermented by the addition of fermentative microorganisms such as lactic acid bacterium and the like to milk. In the process of producing the fermented milk of the present invention, a predetermined amount of a lactic acid bacterium starter, for example at a concentration of 0.1 to 10% by mass, preferably 0.2 to 3% by mass, and more preferably 0.5 to 2% by mass is added with respect to a raw material of fermented milk to obtain a fermented mix. For a fermentative microorganism to be inoculated into raw materials of the fermented milk as a starter, one or two strains selected from lactic acid bacilli such as *Lactobacillus delbrueckii* subsp. *bulgaricus, Lactococcus lactis, Lactobacillus gasseri, Lactobacillus helveticus* and the like; lactic acid cocci such as *Streptococcus thermophilus* and the like; *Bifidobacterium*; propionic acid bacteria; or yeast can be used. Preferably, a combination of *Streptococcus thermophilus* and *Lactobacillus delbrueckii* subsp. *bulgaricus* can be used. More preferably, a combination of *Lactobacillus delbrueckii* subsp. *bulgaricus* 2038 strain and *Streptococcus thermophilus* 1131 strain, alternatively a combination of *Lactobacillus delbrueckii* subsp. *bulgaricus* OLL205013 strain (Accession No. NITE BP-02411) and *Streptococcus thermophilus* OLS3290 strain (Accession No. FERM BP-19638) can be used. More preferably, a combination of *Lactobacillus delbrueckii* subsp. *bulgaricus* OLL205013 strain (Accession No. NITE BP-02411) and *Streptococcus thermophilus* OLS3290 strain (Accession No. FERM BP-19638) can be used.

Fat-free milk solid content contained in the fermented milk of the present invention is not particularly limited as long as the effect of the present invention is not impaired, but it is preferably 8 to 20% by mass of the fermented milk, and more preferably 14 to 17% by mass of the fermented milk. Herein, fat-free milk solids mean the ingredients of total solids in fermented milk except for lipids and include, for example, proteins, ash, and carbohydrates. Also, proteins in the fat-free milk solids in the fermented milk of the present invention include proteins derived from milk fermentation components. The milk fermentation components can be obtained by fermentation of not only milk sampled from a living body but also the fractionated or processed milk. The fractionated or processed product of milk are preferably the fractionated or processed product of cow's milk. For example, they include partially skimmed milk, skimmed milk, reconstituted whole milk, reconstituted skimmed milk powder, reconstituted partially skimmed milk, milk protein concentrate (MPC), milk protein isolate (MPI), whey, skimmed milk, acid casein; casein whey, acid whey, quark whey which are obtained when fermented milk, quark or the like is produced; casein, sodium caseinate, skimmed milk powder, whey protein concentrate (WPC), whey protein isolate (WPI), α-lactalbumin, β-lactoglobulin, lactoferrin, butter, buttermilk, cream, whey peptide, soybean whey and the like. Skimmed milk powder is particularly preferred.

The milk protein concentration in fat-free milk solids contained in the fermented milk of the present invention is 30% by mass or more and is preferably 34 to 70% by mass, and more preferably 34 to 42% by mass.

In addition, the milk protein concentration in the fermented milk of the present invention is 1.9% by mass or more, preferably 3.0% by mass or more, more preferably 3.0 to 15% by mass, further preferably 4.0 to 12% by mass, more preferably 5.0 to 10% by mass, and particularly preferably 5.8 to 8% by mass. The milk protein concentration in the fermented milk of the present invention can be measured, for example, by the Kjeldahl method.

In addition, the fermented milk of the present invention may contain dietary fibers, stabilizers, lipids, vitamins, minerals and the like.

For dietary fibers, they are not particularly limited as long as the effects of the present invention are not impaired, and they include those that inherently exist in food and are edible, those that are obtained by physical, enzymatic or chemical processing, or those that are synthesized. Also, the dietary fiber may be a high-molecular-weight water-soluble dietary fiber, a low-molecular-weight water-soluble dietary fiber, or an insoluble dietary fiber. Such dietary fibers include polysaccharide such as cellulose, carboxymethyl cellulose, agar, xanthan gum, *psyllium* husk, gellan gum, low-molecular-weight sodium alginate, propylene glycol alginate, polydextrose, Arabian gum, indigestible dextrin, beat fiber, guar gum, guar gum enzymatic decomposition product, wheat germ, wet heat treated starch (indigestible starch), resistant starch, tamarind seed gum, locust bean gum, pullulan, inulin and the like. Dietary fibers also include oligosaccharide such as galacto-oligosaccharide, fructo-oligosaccharide, lactosucrose, beat oligosaccharide, gentiolhigosaccharide, xylooligosaccharide, soybean-oligosaccharide or combinations thereof.

Stabilizers include water-soluble soybean polysaccharide, cellulose, carboxymethyl cellulose, alginic acid, propylene glycol alginate, starch, processed starch, carrageenan, xanthan gum, gellan gum, tamarind seed gum, tara gum and combinations thereof.

Lipids are not particularly limited as long as they can be used for food or for medicinal usage, and any lipid may be used. Such lipids include vegetable oils and fats, animal oils and fats, microorganism oils and fats, synthetic triglycerides, phospholipids and the like. They may be used either alone or in arbitrary combination.

Vitamins are not particularly limited as long as they can be used for food or for medicinal usage, and may be used alone or as a mixture of two or more types.

Minerals are not particularly limited as long as they can be used for food or for medicinal usage, and may be used alone or as a mixture of two or more types.

In the present invention, as for the term "promoting elevation of amino acid concentration in the blood", the fermented milk of the present invention is considered to have an effect for promoting elevation of amino acid concentration in the blood if even a slight increase in the amino acid concentration in the blood is observed when a subject ingests the fermented milk for promoting elevation of amino acid concentration in the blood of the present invention, as compared to when the subject does not ingest the fermented milk for promoting elevation of amino acid concentration in the blood of the present invention. According to a preferred aspect of the present invention, as for the term "promoting elevation of amino acid concentration in the blood" of the present invention, the fermented milk of the present invention is considered to have a significant effect for promoting elevation of amino acid concentration in the blood if higher amino acid concentration (preferably essential amino acids, more preferably branched-chain amino acid) in the blood is observed when the fermented milk of the present invention is ingested, as compared to when non-fermented milk containing the same concentration of milk protein as the fermented milk is ingested.

Also, according to a more preferred aspect of the present invention, the rate of increase in the total amino acid concentration in the blood of a subject who ingests the fermented milk for promoting elevation of amino acid concentration in the blood of the present invention is preferably 5% or more, more preferably 10% or more, and further preferably 20% or more, further preferably 30% or more, and further preferably 40% or more as compared to the case where the subject ingests non-fermented milk having the same concentration of milk protein as the fermented milk.

Also, according to a more preferred aspect of the present invention, the rate of increase in the essential amino acid concentration in the blood of a subject who ingests the fermented milk for promoting elevation of amino acid concentration in the blood of the present invention is preferably 5% or more, more preferably 10% or more, further preferably 20% or more, and further preferably 30% more or more, further preferably 40% or more as compared to the case where the subject ingests non-fermented milk having the same concentration of milk protein as the fermented milk.

Also, according to a more preferred aspect of the present invention, the rate of increase in the branched-chain amino acid concentration in the blood of a subject who ingests the fermented milk for promoting elevation of amino acid concentration in the blood of the present invention is preferably 5% or more, more preferably 10% or more, further preferably 20% or more, and further preferably 30% more or more, further preferably 40% or more as compared to the case where the subject ingests non-fermented milk having the same concentration of milk protein as the fermented milk.

Here, amino acids may be either essential amino acids or non-essential amino acids as long as they are amino acids, but preferably essential amino acids, and more preferably branched-chain amino acids. The essential amino acids include valine, leucine, isoleucine, methionine, phenylalanine, tyrosine, tryptophan, lysine, and histidine. Also, the branched-chain amino acid include valine, leucine, and isoleucine. Also, in the present invention, the amino acids mean L-amino acid (L-form) but may contain D-amino acid (D-form) and DL-amino acid (DL-form).

According to a preferred aspect of the present invention, the fermented milk for promoting elevation of amino acid concentration in the blood of the present invention is preferably fermented milk for promoting elevation of essential amino acid concentration in the blood, and more preferably fermented milk for promoting elevation of branched-chain amino acid concentration in the blood.

According to a preferred aspect of the present invention, provided is a food for promoting elevation of amino acid concentration in the blood (preferably a food for promoting elevation of essential amino acid concentration in the blood, more preferably a food for promoting elevation of branched-chain amino acid concentration in the blood) containing the fermented milk of the present invention (for example, the fermented milk comprising a milk protein concentration of 1.9% by mass or more). Here, a food may be the same one mentioned below, specifically any type of food so long as it contains the fermented milk of the present invention, for example, convenience foods such as instant noodles, retort pouch foods, canned foods, microwave meals, instant soups/miso soups, freeze-dried foods and the like; beverages such as soft drinks, fruit juice drinks, vegetable drinks, soy milk drinks, coffee drinks, tea drinks, powdered drinks, concentrated drinks, alcoholic drinks and the like; wheat flour products such as bread, pasta, noodles, cakes mixes, bread crumbs and the like; confectionery foods such as candies, caramels, chewing gum, chocolates, cookies, biscuits, cakes, pies, snacks, crackers, Japanese sweets, jelly, dessert sweets and the like; condiments such as sauces, processed tomato seasonings, flavorings, cooking mixes, sauce items, dressings, soups, curry/stew sauce mixes and the like; oils and fats such as processed oils, butter, margarine, mayonnaise and the like; dairy products such as milk drinks, yogurts, lactic acid bacteria beverages, ice cream, cream and the like; processed agricultural products such as canned agricultural foods, jam/marmalade, cereals and the like; tube feeding/oral nutritious foods such as frozen foods, liquid diet, semi-liquid diet and the like.

For the measurement of amino acid concentration in the blood, for example, blood samples collected from a subject before and after the ingestion of the fermented milk for promoting elevation of amino acid concentration in the blood of the present invention are used. A sampling method of the blood is not limited in particular, but may use blood anticoagulants to prevent coagulation of the blood. The anticoagulants include heparin, sodium citrate, EDTA, and the like. Also, the blood is prepared as serum according to the method of the common knowledge generally accepted in the art, and the serum concerned may be provided as it is for measurement or preservation. The blood collected in such a way may be measured, for example, by a high-performance liquid chromatography (HPLC) method. The high performance liquid chromatography method includes methods in which amino acids are derivatized by a pre-column derivatization method (AQC method, OPA method, FMOC method or the like) or a post-column derivatization method (ninhydrin method, OPA method or the like), and the derivatized amino acids are detected by ultraviolet-visible spectrophotometry (UV method) or mass spectrometry (MS method, MS/MS method).

According to another aspect of the present invention, provided is a method for promoting elevation of amino acid concentration in the blood comprising making a subject ingest the fermented milk comprising a milk protein concentration of 1.9% by mass or more. According to another preferred aspect of the present invention, provided is a method for promoting elevation of amino acid concentration in the blood comprising making a subject ingest the fermented milk comprising a milk protein concentration of 1.9% by mass or more (however, medical treatment for human is excluded). Here, "medical treatment for human" means the act of making a human being ingest (administer) pharmaceutical preparations, which requires a physician's prescription. In addition, in the aspects mentioned above, the subject is preferably a healthy individual. A method for promoting elevation of amino acid concentration in the blood of the present invention can be performed regarding the fermented milk for promoting elevation of amino acid concentration in the blood in the present invention according to the contents described in the present description.

Here, a subject is preferably one who needs to promote elevation of amino acid concentration in the blood. More preferably, the subject is one who expects or requires a muscle synthesis promotion effect, an inhibitory effect of muscle degradation, an anti-fatigue effect, an inhibitory effect of muscle pain, an effect of improving skin quality, an effect of improving cognitive functions, or an effect of sleep improvement. For example, the subject includes one who exercises, conducts a skincare, or treats or prevents insomnia, for the purpose of health improvement, athletic performance enhancement, recovery from latent or obvious fatigue, or improvement of skin quality and sleeplessness. These subjects may also be animals besides human (domestic animals such as horses, cows, and the like, pets such as dogs, cats and the like, animals for appreciation that are bred at zoos and the like).

According to another preferred aspect of the present invention, a method for promoting elevation of amino acid concentration in the blood of the present invention is preferably a method for promoting elevation of essential amino acid concentration in the blood, and more preferably a method for promoting elevation of branched-chain amino acid concentration in the blood.

According to a preferred aspect of the present invention, in the method for promoting elevation of amino acid concentration in the blood of the present invention, the fermented milk (for example, the fermented milk comprising a milk protein concentration of 1.9% by mass or more) can be ingested so that a protein content is 1 g or more per one meal, specifically 1 to 40 g, preferably 2 to 20 g, more preferably 3 to 20 g, further preferably 3 to 15 g, and particularly preferably 3 to 10 g.

According to another aspect of the present invention, provided is use of the fermented milk comprising a milk protein concentration of 1.9% by mass or more for promoting elevation of amino acid concentration in the blood (preferably, promoting elevation of essential amino acid concentration, more preferably promoting elevation of branched-chain amino acid concentration). According to one preferred aspect of the present invention, the use of the present invention is non-therapeutic use.

According to another aspect of the present invention, provided is a food composition for promoting elevation of amino acid concentration in the blood (a food for promoting elevation of amino acid concentration in the blood) containing fermented milk comprising a milk protein concentration of 1.9% by mass or more. In the present invention, a food composition (food) is an item except for a pharmaceutical composition (medicament) and is not particularly limited as long as the item is in the form available for oral ingestion such as a solution, suspension, liquid emulsion, powder, or a solid form product. Here, a food composition (food) may be any form as long as it can contain the fermented milk of the present invention. For example, convenience foods such as instant noodles, retort pouch foods, canned foods, microwave meals, instant soups/miso soups, freeze-dried foods and the like; beverages such as soft drinks, fruit juice drinks, vegetable drinks, soy milk drinks, coffee drinks, tea drinks, powdered drinks, concentrated drinks, alcoholic drinks and the like; wheat flour products such as bread, pasta, noodles, cakes mixes, bread crumbs and the like; confectionery foods such as candies, caramels, chewing gum, chocolates, cookies, biscuits, cakes, pies, snacks, crackers, Japanese sweets, jelly, dessert sweets and the like; condiments such as sauces, processed tomato seasonings, flavorings, cooking mixes, sauce items, dressings, soups, curry/stew sauce mixes and the like; oils and fats such as processed oils, butter, margarine, mayonnaise and the like; dairy products such as milk drinks, yogurts, lactic acid bacteria beverages, ice cream, cream and the like; processed agricultural products such as canned agricultural foods, jam/marmalades, cereals and the like; tube feeding/oral nutritious foods such as frozen foods, liquid diet, semi-liquid diet and the like are included.

In addition, foods include a health food, a functional food, a nutritional supplementary food, a food with function claims, a food for specified health use, a food for patients, infant formula milk, a powdered milk for pregnant women and nursing mothers, or a food with description of usage for promoting elevation of amino acid concentration in the blood. In addition, in the present invention, food is a general concept including beverages.

According to another aspect of the present invention, provided is use of fermented milk, wherein the concentration of a milk protein in the fermented milk is 1.9% by mass or more, for producing a food composition (food) for promoting elevation of amino acid concentration in the blood.

According to another aspect of the present invention, provided is fermented milk, wherein the concentration the milk protein in the fermented milk is 1.9% by mass or more, for promoting elevation of amino acid concentration in the blood.

Fermented milk used in the method for promoting elevation of amino acid concentration in the blood of the present invention or fermented milk contained in the food composition of the present invention or the like may be the same as the fermented milk for promoting elevation of amino acid concentration in the blood described above.

EXAMPLES

The present invention will be explained explicitly according to the following examples, but the present invention is not limited to these examples.

Example 1

Preparation of the Fermented Milk of the Present Invention

A base mix was prepared according to the composition described in the following Table 1. After the prepared base mix was sterilized at a temperature reaching at 95° C., a starter was added and the mixture was fermented at 43° C. (pH was 4.3 at the completion of the fermentation) to prepare the fermented milk of the present invention. As a starter, *Lactobacillus bulgaricus* subsp. *bulgaricus* 2038 strain and *Streptococcus thermophilus* 1131 strain (both bacteria were obtained from "Meiji Bulgaria yogurt" (registered trademark, Meiji Co., Ltd.) were used in combination. Also, the skimmed milk powder used for blending of a base mix was obtained from Meiji Co., Ltd. The compositions of the fermented milk of the present invention are shown in the following Table 2.

TABLE 1

Composition ratio of a base mix

|  | Composition Ratio (% by mass) |
|---|---|
| Skimmed milk powder | 16.55 |
| Starter | 2.00 |
| Water | 81.45 |
| Total | 100.00 |

TABLE 2

Fermented milk of the present invention

|  | Composition (% by mass) |
|---|---|
| Lipid | 0.17 |
| Fat-free milk solids | 16.00* |
| Water | 83.83 |
| Total | 100.00 |

*In 16.00% by mass of fat-free milk solids content, 5.84% by mass was equivalent to milk protein. In other words, milk protein concentration in the fat-free milk solids contained in the fermented milk after the preparation was 36.5% by mass.

Example 2

Evaluation of Absorbability of Protein in Milk

Protein absorbability in the fermented milk prepared in Example 1 was evaluated using 8-week-old SD male rats (they were obtained from Japan SLC, Inc.) after one-week acclimatization.

(1) Administration Test

The fermented milk prepared in Example 1 was further sterilized at 65° C. for 30 minutes and used as a test beverage. A sample prepared by dissolving skimmed milk in water so as to have the same lipid, fat-free milk solids, and solids content composition (%) as those in the fermented milk prepared in Example 1 was used as a control beverage (not subjected to fermentation). The fermented milk prepared in Example 1 and the control beverage have the same concentration of milk protein.

A portal catheter was placed in thirteen 8-week-old SD male rats under Nembutal anesthesia.

One day after the placement of the catheter, rats were subjected to fasting overnight and then were divided into a skimmed milk (control beverage) group (six) and a fermented skimmed milk (fermented milk prepared in Example 1 (fermented milk of the present invention)) group (seven) so that average body weights in each group became even. Rats in each group were given a single oral dose of the skimmed milk or the fermented skimmed milk (fermented milk prepared in Example 1 (fermented milk of the present invention)) at 10 mL/kg BW using a gastric tube. Before the single oral administration and at 30, 60, 90, 120, and 240 minutes after the administration, 200 µL of blood was collected through the catheter into heparinized tubes. After obtaining the plasma from the collected blood, it was cryopreserved at −80° C. and was used for the measurement of amino acid concentrations.

(2) Measurement of Blood Amino Acid in the Portal Vein

After deproteination by adding 3.5% sulfosalicylic acid dihydrate to the obtained plasma in the ratio of 1:2 and centrifuging, the sample was filtered with a 0.45 µm filter (Durapore PVDF 0.45 µm, Millipore). Amino acid concentrations in the samples were analyzed by a high-speed amino acid analyzer (Model L-8800, Hitachi).

Results of measured amino acids, total amino acid (TAA), essential amino acids (EAA), non-essential amino acids (NEAA) and branched-chain amino acids (BCAA) are shown in the following Table 3.

TABLE 3

Classification of total amino acids, essential amino acids, non-essential amino acids, and branched-chain amino acids in the measurement of the amino acids in the portal vein

| Name of amino acid | Abbreviated Name | Total amino acid (Total AA) | Essential amino acid (EAA) | Branched-chain amino acid (BCAA) | Non-Essential amino acid (NEAA) | Others |
|---|---|---|---|---|---|---|
| Valine | Val | ○ | ○ | ○ |  |  |
| Leucine | Leu | ○ | ○ | ○ |  |  |
| Isoleucine | Ile | ○ | ○ | ○ |  |  |
| Methionine | Met | ○ | ○ |  |  |  |
| Phenylalanine | Phe | ○ | ○ |  |  |  |
| Tyrosine | Tyr | ○ | ○ |  |  |  |
| Tryptophane | Trp | ○ | ○ |  |  |  |
| Lysine | Lys | ○ | ○ |  |  |  |
| Histidine | His | ○ | ○ |  |  |  |

TABLE 3-continued

Classification of total amino acids, essential amino acids, non-essential amino acids, and branched-chain amino acids in the measurement of the amino acids in the portal vein

| Name of amino acid | Abbreviated Name | Total amino acid (Total AA) | Essential amino acid (EAA) | Branched-chain amino acid (BCAA) | Non-Essential amino acid (NEAA) | Others |
|---|---|---|---|---|---|---|
| Threonine | Thr | ○ | | | ○ | |
| Cysteine | Cys | ○ | | | ○ | |
| Glycine | Gly | ○ | | | ○ | |
| Alanine | Ala | ○ | | | ○ | |
| Serine | Ser | ○ | | | ○ | |
| Proline | Pro | ○ | | | ○ | |
| Asparagine | Asn | ○ | | | ○ | |
| Glutamine | Gln | ○ | | | ○ | |
| Aspartic acid | Asp | ○ | | | ○ | |
| Glutamic acid | Glu | ○ | | | ○ | |
| Arginine | Arg | ○ | | | ○ | |
| γ-Aminobutyric acid | GABA | | | | | ○ |
| Citrulline | Cit | | | | | ○ |

Also, results of measured Cmax (the maximum blood concentration) of the blood amino acid concentrations in the portal vein are shown in the following Table 4.

TABLE 4

Cmax of the blood amino acid concentrations in the portal vein

| Cmax μmol/ml | Skimmed milk | Fermented skimmed milk | | P-value |
|---|---|---|---|---|
| Total AA | 4.330 ± 0.115 | 4.985 ± 0.226 | * | 0.0320 |
| BCAA | 0.622 ± 0.042 | 0.837 ± 0.041 | ** | 0.0039 |
| EAA | 1.602 ± 0.049 | 1.985 ± 0.088 | ** | 0.0040 |
| Val | 0.261 ± 0.019 | 0.334 ± 0.015 | * | 0.0115 |
| Leu | 0.226 ± 0.016 | 0.321 ± 0.017 | ** | 0.0019 |
| Ile | 0.135 ± 0.008 | 0.185 ± 0.010 | ** | 0.0032 |
| Met | 0.073 ± 0.003 | 0.085 ± 0.004 | * | 0.0330 |
| Phe | 0.102 ± 0.004 | 0.121 ± 0.006 | * | 0.0211 |
| Tyr | 0.105 ± 0.006 | 0.141 ± 0.007 | ** | 0.0030 |
| Trp | 0.103 ± 0.004 | 0.121 ± 0.005 | * | 0.0135 |
| Lys | 0.558 ± 0.032 | 0.597 ± 0.038 | | 0.4521 |
| His | 0.076 ± 0.002 | 0.093 ± 0.005 | * | 0.0156 |
| NEAA | 2.775 ± 0.097 | 3.067 ± 0.118 | | 0.0877 |
| Thr | 0.261 ± 0.015 | 0.299 ± 0.021 | | 0.1791 |
| Cys | 0.030 ± 0.002 | 0.031 ± 0.002 | | 0.7529 |
| Gly | 0.410 ± 0.020 | 0.427 ± 0.022 | | 0.5670 |
| Ala | 0.508 ± 0.032 | 0.637 ± 0.069 | | 0.1382 |
| Ser | 0.297 ± 0.021 | 0.318 ± 0.016 | | 0.4344 |
| Pro | 0.247 ± 0.008 | 0.340 ± 0.025 | ** | 0.0086 |
| Asn | 0.077 ± 0.006 | 0.099 ± 0.010 | | 0.0859 |
| Gln | 0.797 ± 0.027 | 0.816 ± 0.026 | | 0.6315 |
| Asp | 0.0104 ± 0.0015 | 0.0096 ± 0.0005 | | 0.6286 |
| Glu | 0.099 ± 0.010 | 0.103 ± 0.005 | | 0.6763 |
| Arg | 0.164 ± 0.006 | 0.176 ± 0.008 | | 0.2598 |
| GABA | 0.00079 ± 0.00050 | 0.00253 ± 0.00028 | ** | 0.0090 |
| Cit | 0.099 ± 0.002 | 0.112 ± 0.008 | | 0.1446 |

* $p < 0.05$,
** $p < 0.01$

All the values mentioned above were expressed as the mean±standard error. For the significance test of the mean value of Cmax, when homoscedasticity between groups was recognized by performing an F-test, a statistical analysis using Student's t-test was performed. When homoscedasticity was not recognized, a statistical analysis using Aspin-Welch's t-test was performed.

From the results in Table 4 mentioned above, administration of fermented skimmed milk (the fermented milk prepared in Example 1, the fermented milk of the present invention) showed significantly higher Cmax (the maximum blood concentration) of the total blood amino acids (Total AA), essential amino acids (EAA), branched-chain amino acids (BCAA), isoleucine (Ile), leucine (Leu), and valine (Val) in the portal vein, as compared to administration of skimmed milk (control beverage) having the same concentration of milk protein as the fermented skimmed milk. It was shown that the absorption rate of these amino acids from the fermented skimmed milk was faster than that from the skimmed milk.

Therefore, the fermented milk of the present invention can increase the peak of amino acid concentration in the blood and promote elevation of the amino acid concentration in the blood. As a result, it can be expected to improve and prevent muscle loss associated with aging (sarcopenia).

ACCESSION NO

NITE BP-02411
FERM BP-19638

The invention claimed is:

1. A method for promoting elevation of an amino acid concentration in blood in a subject, comprising making a subject ingest an effective amount of fermented milk,
   wherein the fermented milk comprises a milk protein in a concentration of 1.9% by mass or more,
   wherein the fermented milk is fermented by lactic acid bacterium consisting of *Lactobacillus delbrueckii* subsp. *Bulgaricus* and *Lactococcus lactis*,
   wherein the amino acid is at least one selected from the group consisting of tryptophan, histidine and tyrosine,
   wherein the subject is a human, a dog, or a cat, and
   wherein the effective amount of fermented milk is the amount effective to achieve at least one selected from the group consisting of:
   a maximum blood concentration (Cmax) of the tryptophan in the blood after administration of fermented milk is at least 10% higher than Cmax of the tryptophan in the blood after administration of non-fermented milk containing the same concentration of milk protein as the fermented milk;
   a maximum blood concentration (Cmax) of histidine in the blood after administration of fermented milk is at least 5% higher than Cmax of histidine in the blood after administration of non-fermented milk containing the same concentration of milk protein as the fermented milk; and a maximum blood concentration (Cmax) of tyrosine in the blood after administration of fermented milk is at least 5% higher than Cmax of tyrosine in the blood after administration of non-fermented milk containing the same concentration of milk protein as the fermented milk.

2. The method of claim 1, wherein the concentration of the milk protein in the fermented milk is 3.0% by mass or more.

3. The method of claim 1, wherein the method is for promoting elevation of the other essential amino acid concentration in the blood in addition to the amino acid concentration in the blood.

4. The method of claim 1, wherein the method is for promoting elevation of branched-chain amino acid concentration in the blood in addition to the amino acid concentration in the blood.

5. The method of claim 1, wherein the subject ingests a food comprising the fermented milk.

6. The method of claim 1, wherein *Lactobacillus delbrueckii* subsp. *bulgaricus* is *Lactobacillus delbrueckii* subsp. *bulgaricus* OLL205013 strain (Accession No. NITE BP-02411).

7. The method of claim 1, wherein a raw material of the fermentation is selected from the group consisting of skimmed milk powder, partially skimmed milk, skimmed milk, reconstituted whole milk, reconstituted skimmed milk powder, reconstituted partially skimmed milk, milk protein concentrate (MPC), milk protein isolate (MPI), whey, acid casein; casein whey, acid whey, quark whey which are obtained when fermented milk or quark is produced; casein, sodium caseinate, skimmed milk powder, whey protein concentrate (WPC), whey protein isolate (WPI), α-lactalbumin, β-lactoglobulin, lactoferrin, butter, buttermilk, cream, whey peptide, and soybean whey.

8. The method of claim 1, wherein the effective amount of the fermented milk is 1 g or more as the milk protein derived from the fermented milk.

9. The method of claim 1, wherein the effective amount of the fermented milk is 1 to 40 g as the milk protein derived from the fermented milk.

* * * * *